(12) United States Patent
Nam

(10) Patent No.: US 9,569,711 B2
(45) Date of Patent: Feb. 14, 2017

(54) LABEL FOR BARCODES, LETTERS AND IMAGES AND METHOD FOR FORMING BARCODES, LETTERS AND IMAGES

(71) Applicant: TOOTECH CO., LTD., Seoul (KR)

(72) Inventor: Eui-Jo Nam, Seoul (KR)

(73) Assignee: TOOTECH CO., LTD., Seoul (KR)

( * ) Notice: Subject to any disclaimer, the term of this patent is extended or adjusted under 35 U.S.C. 154(b) by 0 days.

(21) Appl. No.: 14/760,934

(22) PCT Filed: Jan. 8, 2014

(86) PCT No.: PCT/KR2014/000179
§ 371 (c)(1),
(2) Date: Jul. 14, 2015

(87) PCT Pub. No.: WO2014/178520
PCT Pub. Date: Nov. 6, 2014

(65) Prior Publication Data
US 2016/0034803 A1      Feb. 4, 2016

(30) Foreign Application Priority Data

Apr. 29, 2013   (KR) .................. 10-2013-0047491

(51) Int. Cl.
*G06K 19/02*       (2006.01)
*G06K 19/06*       (2006.01)
(Continued)

(52) U.S. Cl.
CPC ............ *G06K 19/0614* (2013.01); *B41J 2/442* (2013.01); *B41J 3/01* (2013.01); *B41J 11/0015* (2013.01);
(Continued)

(58) Field of Classification Search
CPC .......... G06K 19/02; G06K 5/00; G06K 19/06; G06K 19/00; G06F 17/00
(Continued)

(56) References Cited

U.S. PATENT DOCUMENTS

2005/0001419 A1*   1/2005   Levy .................. B41M 5/24
                                            281/2
2007/0081144 A1*   4/2007   Hoshino .............. G09F 3/02
                                            356/71

(Continued)

FOREIGN PATENT DOCUMENTS

| GB | 2364018 A      | 1/2002  |
|----|----------------|---------|
| JP | 05-077068      | 3/1993  |
| JP | 06-128537      | 5/1994  |
| JP | 2007-021818 A  | 2/2007  |
| JP | 2011-073281 A  | 10/2012 |
| KR | 10-2004-0078080 A | 5/2005 |
| KR | 10-0815623 B1  | 3/2008  |
| KR | 10-2009-0108790 A | 10/2009 |
| KR | 10-2010-0137774 A | 12/2010 |

*Primary Examiner* — Edwyn Labaze
(74) *Attorney, Agent, or Firm* — Maschoff Brennan

(57) ABSTRACT

An image label is used to present a barcode and characters and images. The label is printed label with a pre-determined color among various colors such that the characters and images resist subsequent erasure due to friction or chemical materials, etc. A laser beam is projected onto a surface of the barcode. A loss layer is used to form an image in response to the projection of the laser beam. A loss sheet includes a transparent sheet that is placed on the loss layer. A dark sheet is attached at the lower part of the loss sheet, and includes a color ink layer that expresses a pre-determined color among various colors and is attached to the upper part of the loss layer. The color ink layer which has the pre-determined color among the various colors is furnished at the upper part of the transparent sheet.

12 Claims, 3 Drawing Sheets

(51) Int. Cl.
*B41M 5/26* (2006.01)
*B41J 2/44* (2006.01)
*G06K 1/12* (2006.01)
*B41J 3/01* (2006.01)
*B41J 11/00* (2006.01)

(52) U.S. Cl.
CPC ............... *B41M 5/26* (2013.01); *G06K 1/123* (2013.01); *G06K 1/126* (2013.01); *G06K 19/02* (2013.01); *G06K 19/06028* (2013.01); *B41M 5/267* (2013.01)

(58) Field of Classification Search
USPC .................. 235/488, 380, 492, 487, 375
See application file for complete search history.

(56) References Cited

U.S. PATENT DOCUMENTS

| | | | |
|---|---|---|---|
| 2008/0160226 A1* | 7/2008 | Kaule | D21H 21/44 428/29 |
| 2012/0040154 A1* | 2/2012 | Dinescu | D06Q 1/12 428/200 |
| 2013/0239828 A1* | 9/2013 | Chen | G09F 3/00 101/31 |
| 2014/0224170 A1* | 8/2014 | Noe | G09F 3/02 116/200 |

* cited by examiner

LABEL FOR BARCODES, LETTERS AND IMAGES AND METHOD FOR FORMING BARCODES, LETTERS AND IMAGES

TECHNICAL FIELD

The present invention relates method for making the barcode, the characters and the images for common purpose of the barcode, the characters and the image and particularly making label with a pre-determined color among various colors and simultaneously not erasing due to friction or chemical material etc.

BACKGROUND ART

It is well known for indicating product name, characteristic, quantities on the wrapping papers or the products and mainly, as an indication way, a way of printing the barcode, characters and the images on the wrapping papers or the products or a way of attaching label which the barcode, the characters and the images is printed on the wrapping papers or the products is used.

Also, as one of printing ways, there are printout printing, thermal transfer printing, thermosensitive printing and laser printing etc.

The printout printing is to use a thermal printer or ink jet printer and spraying an ink on an outer surface of a film is publicly known and in case of this, printing is erased by happening friction on the way of delivering and sometime it would be happened a malicious behavior erasing already existing printing after that reprinting in order to extend expiration date.

And the thermal transfer printing is a way that a color layer is positioned on a side and it makes the barcode, the characters and the images by thermal element in the middle of a layer which is positioned on the other side.

Also, in case of the thermosentive printing, a heated pin of a printing machine smoothly contacts with a thermosensitive paper what has been treated with a special coating and a color of the heated part is changed into a dot so that it is a recording way of the barcode, the characters and the images.

And the laser printing uses material that it is ash by burning a paper or by a plastic film. Tinted ink is sprayed on ash by burning a paper so that it makes a color layer after then this method projects a laser beam in order to make partially the color layer disappear. This method uses a way that various colors of paper ash prints the barcode, the characters and the images to a laser beam projected area. A laser beam is projected to plastic film ash and this prints the barcode, the characters and the images.

These ways have a drawback that the barcode, the characters and the images are easily erased by friction or chemical material.

The present invention, generally speaking, already has suggested one of solutions in Korean Patent No. 10-0615938.

To further illustrate, this idea provides a method for making non erasable the barcode, the characters, the images label and the barcode that it is consist of making a some part in transparent, making other part of the barcode and the characters in non-transparent, including a loss sheet what an image is printed, making a dark sheet that is attached at the lower part of the loss sheet, projecting a laser beam that it makes the barcode and the characters, the images by that a specific area of the loss sheet is lost and a color of the dark sheet is appeared.

Accordingly, the barcode and the characters, the images use a laser printing way rather than a traditional printing way and make a specific area of a non transparent loss sheet in transparent by projecting a laser beam, make barcode and character by appearing a black color of the dark sheet so that it makes the barcode and the characters, the images not to be damaged by friction or chemical material.

Herein, a loss layer by a laser beam has silver color because this layer made by silver ink that all aluminum particles is included or attached.

A problem by this way is that the barcode and the characters, the image label have a silver color and this cannot satisfy a customer's demand that they want to have various colors.

DISCLOSURE

Technical Problem

In order to resolve the mentioned problems, the present invention provides method for making the barcode, characters and the images for common purpose of the barcode, characters and the images and particularly making label with a pre-determined color among various colors and simultaneously not erasing due to friction or chemical material etc.

Technical Solution

The present invention for an image label for common purpose of the barcode, characters and the images, comprising: A barcode appearing printed color images in responding that a laser beam is projecting to a surface of the barcode; A loss layer that an image is formed; A loss sheet consisting of a transparent sheet that is placed on the loss layer; and A dark sheet that is attached at the lower part of the loss sheet, is characterized in including a color ink layer that a pre-determined color among various colors is expressed and is attaching the upper part of said loss layer.

The color ink layer is characterized in further including various colors more than one color and this is desirable for including a transparent protective film that is further attached on the upper part of the color ink layer.

The transparent sheet, this sheet is a transparent and film type that it does not respond from a laser beam, uses one of PET (Polyethylene Terephthalate), OPP (Oriented Polypropylene) and PP (Polypropylene).

The loss layer is made by one of methods between aluminization on the lower part of the transparent sheet and spraying a silver ink on the lower part of the transparent sheet.

The dark sheet is made by a pre-determined color ink that it is no responding to a laser beam or a film type material.

Meanwhile, it is more desirable for further including a dark sheet protection film that is placed between the dark sheet and an adhesion layer that it makes products attach easily and this is positioned on the lower part of the dark sheet.

The present invention provides that a method for making the barcode, characters and the images, comprising the following steps: Forming a loss sheet including a loss layer at the lower part of a transparent sheet; Attaching a dark sheet at the lower part of said loss sheet; and Projecting a laser beam that a specific part is lost and make the barcode, characters and the images, is characterized in making common purpose of the barcode, characters and the images, wherein attaching a color ink layer that pre-determined color is expressed at said both sides of said loss sheet.

This invention further carries out a transparent protective film step that attaches a transparent protective film at the upper part of said color ink layer after said attaching the color ink layer.

After the transparent protective film step, this invention further carries out attaching an adhesion layer at the lower part of said dark sheet.

Also, this invention is further processing a dark sheet protection film attaching step that a dark sheet protection film is included between said dark sheet and adhesion layer before processing said adhesion layer attaching step.

Advantageous Effects

According to the invention, the method for making the barcode, the characters and the images, as a color ink layer that a pre-determined color among various colors is expressed on the upper part of said loss layer is further included, provides an effect that it is possible to make various color labels what customer or seller wants to be expressed and satisfy a demand for various label design so that it can look luxuriously.

And the barcode and the character, the images are made by a laser printing way that it makes to be appeared a specific color of a dark sheet by projecting a laser beam so that it provides an additional effect that the barcode and the characters, the images not to be damaged by friction or chemical material.

Also, it is possible to make the barcode and the characters, the images with not only expressing a black color but also expressing various colors such as blue, red or yellow.

Additionally, the invention protects to change an important data such as manufacturing date, expiration date or quality assurance date. According to this invention, a malicious person cannot change important data on a wrapping paper or product and a behavior that this person resells a product which an expiration date or quality assurance date is changed or would not be happened so that this invention provides an benefit that customers trust a product quality or content.

Meanwhile, an important data can be preserved until a label of a wrapping paper or product is discarded so that it can provide an effect pursuing seller or middle management when a wrapping paper or product is discarded.

Also, pursuing seller or middle management when a wrapping paper or product is discarded can be possible and a company needs to consider seller or middle management who is related to a wrapping paper or product. Therefore, this invention provides an effect that bad parts or poor foods in a process of production are not used and it increases product reliability.

DESCRIPTION OF DRAWINGS

The present invention, the barcode, the characters, the image label, may be further understood from the following description. In the drawing.

BEST MODE

The present invention for an image label for common purpose of the barcode, characters and the images, comprising: A barcode appearing printed color images in responding that a laser beam is projecting to a surface of the barcode; A loss layer that an image is formed; A loss sheet consisting of a transparent sheet that is placed on the loss layer; and A dark sheet that is attached at the lower part of the loss sheet, is characterized in including a color ink layer that a pre-determined color among various colors is expressed and is attaching the upper part of said loss layer.

Mode for Invention

The following describes the present invention which is related to the barcode, the characters, and the image label with drawings.

Figure 1:
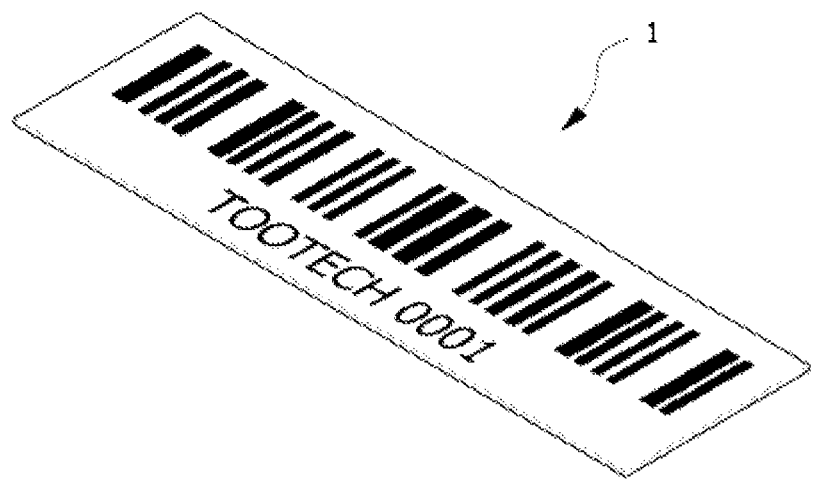
FIG. 1 is a perspective view of an exemplary of the barcode, the characters, and the image label.
Figure 2:
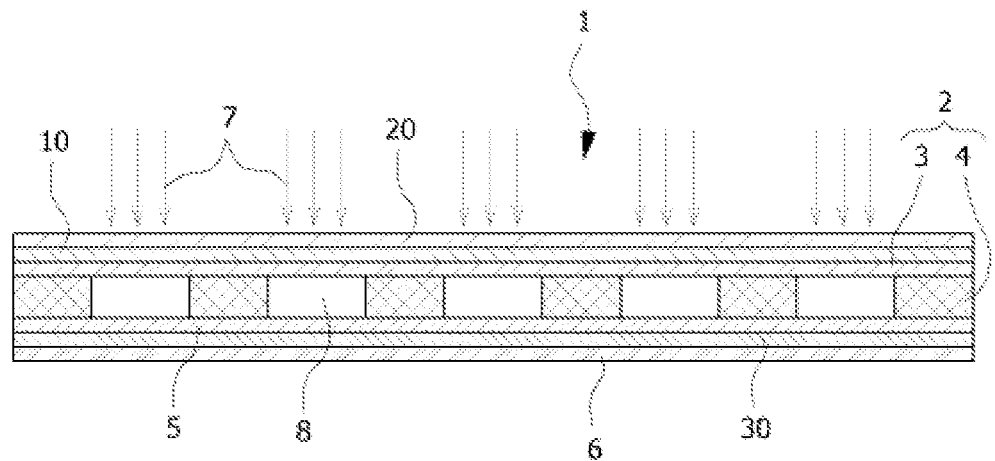
FIG. 2 is a cross-sectional view of an exemplary of the barcode, the characters, and the image label.

FIG. 1 is a sectional view of an exemplary of the barcode, the characters, and the image label and FIG. 2 is a cross-sectional view of an exemplary of the barcode, the characters, and the image label.

As illustrated in drawings, a structure of label (1) from upper part to the lower part in the invention is consist of a transparent protective film (20), a color ink layer (10), a transparent sheet (3) and a loss sheet which is include in a loss layer (4), a dark sheet (5), a dark sheet protection film (30) and an adhesion layer (6).

The transparent protective film (20) which is placed on an upper part of the color ink layer (10) is to protect the color ink layer (10) and it prevents a situation that a color is erased by friction or a color is changed.

The transparent protective film (20) is desirable for making a transparent film type material and using one of PET (Polyethylene Terephthalate), OPP (Oriented Polypropylene) and PP (Polypropylene) materials and this invention is not limited to these kinds of materials. It is possible to use a similar transparent type material which is positioned on an upper part of the label (1) and this invention can change material easily.

The transparent protective film (20) is to protect the color ink layer (10) so if the color ink layer process other treatment in order to block to rub off by friction or change color, it is possible to not attach the transparent protective film (20).

Accordingly, the ink layer (10) which colored pre-determined among various colors can be processed with a transparent thin film and it can block to rub off by friction or color change. In case of this, it is not necessary to include the transparent protective film (20).

However, the transparent protective film (20) is skipped in case that another process carry out other than coloring the color ink layer (10). It needs to determine cost or time for processing another process or attaching the transparent protective film (20).

The color ink layer (10) is attached on an upper part of the loss sheet (2) and it is expressed with a pre-determined color among various colors.

Herein, illustrating a pre-determined color of a color ink layer can be used publicly known ways. In other words, one of illustration ways is spraying a pre-determined color ink to a film type material or evaporating a pre-determined color to a film type material and this way is to be used for the label (1).

Meanwhile, the color ink layer (10) is not responding to a laser beam and it is desirable to use a color of the color ink layer which is not responding to the laser beam.

And a color ink layer can be expressed by various colors or more than two colors according to a pattern, design or shape.

A color for the color ink layer (10) can be selected among one of colors such as yellow, red, green or blue etc and it can be divided horizontally, vertically or diagonally. It can be divided a surface of the color ink layer (10) into multiple sections and each section may be colored by pre-determined color.

Also, it is possible to consist that each section of the surface of the color ink layer can be expressed to various shapes (circle, triangle, square and Polygram etc or trademark, logo) according to customer or seller demands. A surface of the color ink layer (10) can be partitioned and it can be colored in each partition with a pre-determined color.

Meanwhile, the color ink layer paints lightly with a pre-determined color. In other words, if the color ink layer is painted thickly, the color ink layer would respond in projection of a laser beam or a color which is painted in a dark sheet (5) would not be shown even if barcode, character, and an image is made so that the color ink layer (10) would be painted opaquely.

Therefore, the water soluble liquid is mixed with the ink of the pre-determined color or controlling the thickness and of the color layer for painting the level of diluteness. The color in which the color ink layer (10) is thin is expressed. At this time, it is of course that the color ink layer (10) has to be equipped to the color of the extent in which the color of the dark sheet (5) is found and thickness and concentration.

A loss sheet which is attached on the upper part of the dark sheet (5), as described above, is consist of the transparent sheet (3) and the loss layer (4).

The transparent sheet (3) makes from a film type material which not responds to a laser beam and this is positioned on the upper part of the loss sheet (4) for protecting the loss layer from a dust or foreign substance.

The film type material of the transparent sheet (3) are made from among PET (the polyethylene terephthalate, and the polyetheneterephthalate), OPP (the polypropylene Oriented film, and the oriented polypropy-lene), and any one already selected between PP (polypropylene, and polypropylene).

The loss layer is responding to a laser beam, it can be made by a way of aluminum evaporation on the lower part of the transparent sheet (3), a way of spraying a silver ink on the lower part to the transparent sheet (3). It does not be limited on the describe ways above.

Some parts of the loss layer (4) would be lost by a laser beam and it has a characteristic that a color at the lower part of the dark sheet (5) is shown clearly.

Herein, it is desirable that a specific part of the loss layer (4) would be formed in transparent and other part would be formed in opaque by a laser beam.

Thus, the dark sheet (5) is attached on a lower part of the loss sheet and it does not respond to a laser beam (6) and it made from a film type or the pre-determined color painted ink.

The dark sheet (5) is using a black ink or a film type material but it does not limit on the described ways above. The dark sheet (5) is using one of colors such as blue, red or yellow etc and a color at the barcode, the characters and the images etc can be colored not only black color but also other pre-determined colors.

An adhesive material is sprayed at the adhesion layer (6) which is attached on the lower part of the dark sheet and it makes the label (1) attach to a wrapping paper or product freely.

When the adhesion layer of the label (1) is attached at a wrapping paper or product, it would be happed a situation that it need to be attached at a correct position vertically or horizontally but the label is not attached correctly according to a level of a skilled employee.

A situation that a person wants to attach correctly again, it cannot reuse the label (1) because the dark sheet (5) is damaged by an adhesion layer (6).

Accordingly, it is desirable further to comprise a dark sheet protection film (3) between the dark sheet (5) and the adhesion layer (6) and it makes the label (1) reattach.

By the way, the transparent protective film (20), the color ink layer (10), the loss sheet (2), the dark sheet (5) and the dark sheet protective film (3) attach to sides which are facing each other.

Attaching ways are not limited on an adhesive material and heat and pressure can be used for attaching, pressing and accumulating at the melt temperature. For more information about how to attach the various methods are currently being used for this invention and the various methods listed above or by selecting any one of the described ways.

The loss sheet (2) is set to be on the upper part of the loss sheet (2) of the color ink layer (10) is expressed in color ink layers required, and the lower part of the loss sheet (2) is fitted with the dark sheet (5), the dark sheet (5) will adhere to the lower part of the sheet is included. At this point, the color ink layer (10) can be made transparent protective film on the upper part of the capital as well.

The label (10) is a laser beam projecting to a specific part and loss the loss layer and the color label is visible in the upper part of the label so that the barcode, the characters, the images is formed.

At this time, the label (1) of the barcode, the character and the images is expressed as the color which is expressed in the dark sheet (5). The color is expressed with other colors other than a color is expressed in the color ink layer (10). Therefore with making the label (1) which the barcode, the characters, and the images are decorated with the color of the set natural disposition is expressed.

Therefore, a color in which the barcode, the characters, and the images were restricted to the label (1) were expressed as black with silver color. But according to the invention, barcode, character and image variously can be changed. The color of the natural disposition variously can be changed and the various demand condition of the consumer or the seller can be easily satisfied.

Moreover, according to the requirements of the consumer or the seller, the color of the label (1) can be changed to various forms. Also the label (1) uses not only one color which is expressed in the label (1) but also color more than two kinds of is expressed, the various designs of labels (1) in which the specific pattern, the pattern, or the shape is expressed forms.

The label (1) as described above adheres to the wrapping paper or the corresponding to product using the adhesion layer (6). While confirming important data which is recorded in the label (1), the process of distribution and sales process etc. are progressed.

And by using the transparent protective film (20) of the label (1) or the color ink layer (10) or the transparent sheet (3), it is prevented that dust or the foreign substance etc. penetrate into the loss layer (4). Data recorded in the label (1) are not damaged. Moreover, since it prevents that the label (1) is easily damaged by the external contact or the chemical substance etc. data recorded in the label (1) can be preserved.

At this time, even if data recorded in the label (1) is changed by a malicious behavior, it is completely protected by the transparent protective film (20), the color ink layer (10), or the transparent sheet (3). In this case, data recorded in the label (1) are not changed and the consumer trusts about the article within the wrapping paper or the product.

Hereinafter, according to drawings of the invention, barcode, the character, and the images forming method are particularly explained.

Figure 3:
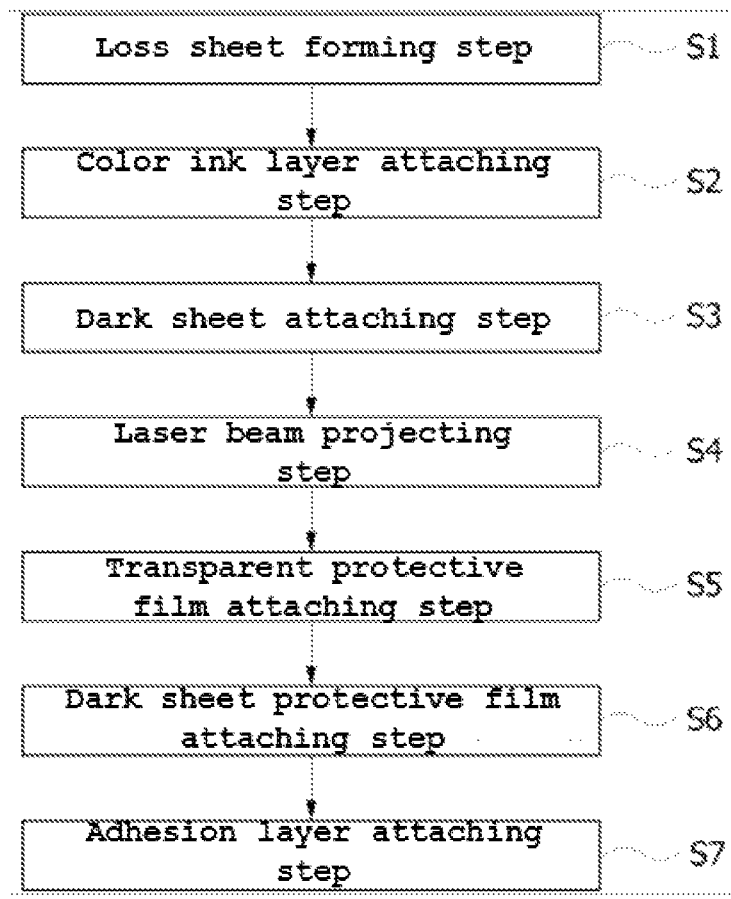
FIG. 3 is a flow chart of an exemplary of the barcode, the characters, and the image label

FIG. 3 is a flowchart showing the invention barcode, the character, and the images forming method. It comprises the loss sheet forming step (S1), the color ink layer attaching step (S2), the dark sheet attaching step (S3), the laser projecting step (S4) and the adhesion layer attaching step (S7). And the transparent protective film attaching step (S5) can be more progressed.

The loss sheet forming step (S1), is furnished with the aluminum evaporation at the lower part of the transparent sheet (3) etc or spraying to the lower part of the loss sheet (2) for making the loss layer (4).

The transparent sheet (3) comprises the transparent material of the film type of material which does not respond to the laser beam (7) and it is furnished in the upper side of the loss layer (4) and it prevents from dust or the foreign substance etc. penetrating into the loss layer (4).

The film type of material is comprised among PET (the polyethylene terephthalate, and the polyethyleneterephthalate), OPP (the polypropylene Oriented film, and the oriented polypropy-lene), and any one already selected between PP (polypropylene, and polypropylene).

The loss layer (4) as described above is furnished by aluminum evaporation or spraying silver color ink to the lower part of the transparent sheet (3). While the laser beam (7) is projected, the projection unit (8) reacts and a color of the dark sheet (5) of the lower part is shown. It is desirable that the transparent has a transparent characteristic while the loss layer (4) of the transparent sheet (3) is destroyed by the laser beam (7).

Therefore, the loss layer (4) is destroyed by a laser beam (7) and a specific part is changed to transparent and other part is changed to opaque so that barcode, the character, the images etc in the label are formed.

The color ink layer (10) in which the color ink layer sticking step (S2) the set color is expressed in the upper side of the loss sheet (2) may be referred to the step adhering.

As described above, the color ink layer (10) already can express one color. It can be expressed as color more than two kinds of according to the pattern, to express the pattern, or the shape etc. The various designs and color can be expressed according to the demand of the consumer or the seller.

In the meantime, it has to be furnished that color opens so that the color ink layer (10) is expressed as the pre-determined color. That is, the barcode the color ink layer (10) reacts, character, and the thin color have to be particularly included with the laser beam (7) projection if the color of the color ink layer (10) is thickly included. As to the thin color, the pre-determined color is certainly expressed the color which is expressed in the dark sheet (5) because the images of the color ink layer (10) is not shown.

Therefore, the water soluble liquid is mixed with the ink of the pre-determined color and color is sloppily or the thickness of the color layer coated is controlled. The thin color is expressed in the color ink layer (10). At this time, it emphasizes that the color ink layer (10) has to be furnished to the color of the extent in which the color of the dark sheet (5) is found and thickness and concentration.

The dark sheet attaching step (S3), is the dark sheet (5) in the lower side of the loss sheet (2) may be referred to the step adhering.

The dark sheet (5) comprises the material of the ink in which the pre-determined color is expressed or the film type of material which is not responding to the laser beam (7).

As described above, the dark sheet (5) uses black ink or the film type of material. But in the present invention, it is not limited on ways as described above. It includes the dark sheet (5) in which the pre-determined color is expressed among the various color including blue, red, or yellow etc. The barcode, the character, the images etc shown in the label (1) are expressed through not only black but also the pre-determined other color.

The laser projecting step (S4) is that the laser beam (7) in a specific area of the loss sheet (2) may be referred to the step of forming the barcode, the character, and the images that it projects and the specific area of the loss layer (4) is evanished. That is, the barcode, the character, and the images are formed by that the laser beam (7) passes through the color ink layer (10) and transparent sheet (3) and a projected part of the loss layer (4) are responded. Therefore, the barcode, the character, and the images are shown to the color of the dark sheet (5) expressed at the upper part.

In the meantime, a laser which is projecting the laser beam (7) can make a kind of laser that is responding to the loss layer (4), and any one of Fiber Laser, and the YAG Laser are selected.

The adhesion layer attaching step (S7), is the adhesion layer (6) in the lower side of the dark sheet (5) may be referred to the step adhering.

As to the adhesion layer (6), the adhesive material is coated and it easily adheres to the label (1) to attach to the wrapping paper or the product.

At this time, as described above, when the label (1) attaches to the wrapping paper or the product by using the adhesion layer (6), the label (1) shall be correctly positioned in light of perpendicularity and horizontal. However, the case where the label (1) is wrongly attached according to the skill-level and working condition of the operator etc.

Thus, when a person detach the label (1) which was attached wrongly and this person tries to attach to the correct position, the dark sheet (5) is damaged by the adhesion layer (6) it falls down and the label (1) cannot be reused.

Therefore, before processing the adhesion layer attaching step (S7), it is desirable that the dark sheet protection film (30) is furnished between the dark sheet (5) and the adhesion layer (6). The dark sheet protection attaching step (S6) which the dark sheet protection film (30) is attached to the lower part of the dark sheet (5) is further processed, so that the dark sheet (5) is not damaged and the label (1) can be reattached to the correct position.

Meanwhile, as described above, the transparent protective film attaching step (S5) which is attached to the upper part of the color ink layer (10) can be further processed.

The transparent protective film (20) comprises the transparent material of the film type of material. It prevents from being effaced with the external friction or the color expressed in the color ink layer (10) discoloring.

And the adhesive is coated at the side which faces while the transparent protective film (20), color ink layer (10), loss sheet (2), dark sheet (5) and dark sheet protection film (30) correspond with each other and these are attached.

At this time, any one of various methods it does not limited on using the adhesive but instead of this, it can adhere with heat and pressure and alternatively, the method for extruding the molten resin and being laminated are used.

As described above, if the loss sheet forming step (S1), color ink layer attaching step (S2), dark sheet attaching step (S3), laser projecting step (S4), dark sheet protection film attaching step (S6), adhesion layer attaching step (S7) and transparent protective film attaching step (S5) are progressed, the pre-determined barcode, the character, and the images are expressed and the label (1) which the natural disposition of the pre-determined color is expressed with together.

That is, the color ink layer (10) color is expressed as the background. The dark sheet (5) color is expressed as the barcode, the label, and the images. The various labels (1) can be made corresponding to the demand of the consumer or the seller and.

In addition to, the steps as described above are not limited to this explanation. But the sequence of this invention is variously changed according to the method for forming the label (1) and design or the requirement specification etc. and it is belonged to the scope of the present invention that the invention barcode, the character, and each step-by-step sequence of the images forming method are changed and each step-by-step sequence perform.

The invention claimed is:

1. An image label for common purpose of rendering a barcode, characters and images, comprising:
    a loss layer where the images are formed;
    a loss sheet consisting of a transparent sheet that is placed on the loss layer;
    a color ink layer that expresses pre-determined color and which is attached to an upper part of the loss sheet and which does not respond to a laser beam; and
    a dark sheet that is attached at a lower part of the loss sheet,
    wherein the color ink layer expresses pre-determined color to the extent that the color of dark sheet can be found; and
    wherein if a laser beam projected to a surface of the loss layer, the projected area of the loss layer is burnt out and the color of the dark sheet beneath the loss layer can be seen through the burnt-out portion.

2. The label according to claim 1, wherein the color ink layer expresses more than one color.

3. The label according to claim 1, the label comprises a transparent protective film that is placed on the upper part of the color ink layer.

4. The label according to claim 1, wherein the transparent sheet consists of a transparent material that is a film type material and does not respond to a laser beam and said film type material is one of PET (Polyethylene terephthalate), OPP (Oriented Polypropylene) and PP (Polypropylene).

5. The label according to claim 1, wherein the loss layer that is made by one of the two methods between aluminization on the lower part of the transparent sheet and spraying a silver ink on the lower part of the transparent sheet.

6. The label according to claim 1, wherein the dark sheet does not respond to the laser beam and comprises ink that expresses pre-determined color or a film type material.

7. The label according to claim 1, wherein the label comprises an adhesion layer that may be attached to a product.

8. The label according to claim 7, wherein a dark sheet protective film is further included between said dark sheet and the adhesion layer.

9. A method for making the label for common purposes of the barcode, the characters and the images, comprising:
    forming a loss sheet including a loss layer at a lower part of a transparent sheet;
    attaching a dark sheet which does not respond to a laser beam to the lower part of the loss sheet; and
    projecting a laser beam to the specific part of the loss sheet to make the images by burning out some part of the loss layer wherein the color of the dark sheet beneath the loss layer can be seen through the burnt-out portion;
    attaching a color ink layer which expresses a pre-determined color to the upper part of the loss sheet.

10. The method according to claim 9, further comprising attaching a transparent protective film at the upper part of said color ink layer.

11. The method according to claim 9, further comprising:
    attaching an adhesion layer at the lower part of said dark sheet.

12. The method according to claim 11, further comprising:
    attaching a dark sheet protection film between said dark sheet and adhesion layer before attaching the adhesion layer.

* * * * *